Patented Nov. 8, 1938

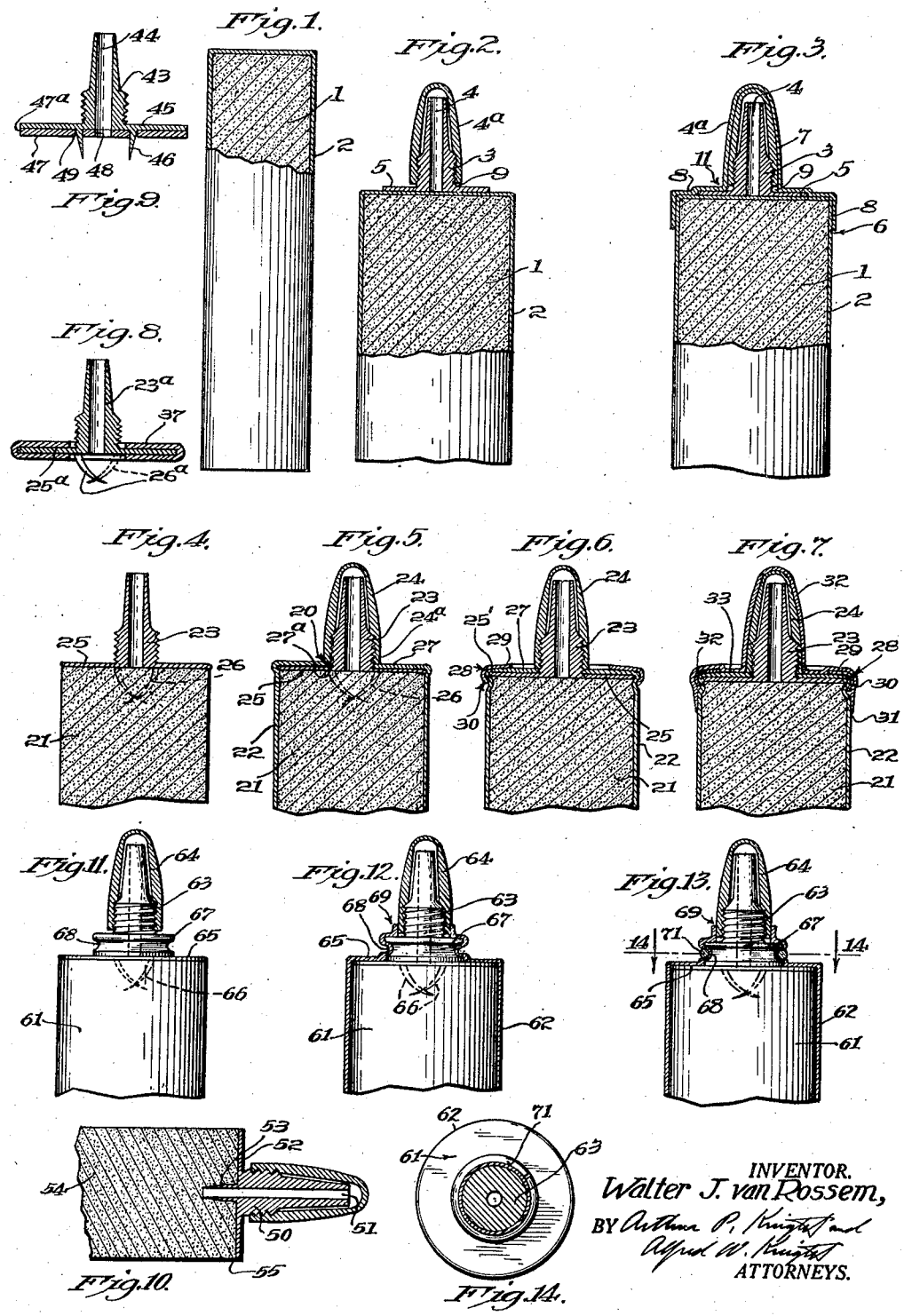

2,136,033

UNITED STATES PATENT OFFICE 2,136,033

DISPENSING PACKAGE OF THERMOPLASTIC MATERIAL

Walter J. van Rossem, West Los Angeles, Calif., assignor to Surgident, Ltd., West Los Angeles, Calif., a corporation of California Application October 26, 1936, Serial No. 107,618

10 Claims. (Cl. 221—60)

This invention relates to an advantageous dispensing package of material containing a volatile constituent and pertains more particularly to a dispensing package which is sufficiently hermetic to preserve a desired proportion of the volatile constituents of said material for reasonable storage periods so that the material may reach the consumer in good condition.

The package of the present invention is primarily adapted for enclosing thermoplastic dental molding compositions. Those compositions are semi-rigid when cool and must be heated to render the same fluent for use. Hydrocolloid compositions of this general type are described in U. S. Patents Nos. 1,672,776, 2,021,058 and 2,020,311. Such materials ordinarily contain volatile constituents, such as water. These materials have been conventionally marketed in the form of sticks or cylinders about one inch in diameter and four inches long, wrapped in tinfoil envelopes or the like, or as described in U. S. Patent No. 1,977,580, enclosed in a celluloid envelope which is in turn enclosed in a moisture-impervious envelope such as a glass bottle or a wax coating. Foil wrappers are objectionable in that they are not sufficiently moisture-retentive, and such wrappers also cause discoloration of the contained composition due to the metallic contact. This discoloration prejudiced the user. In view of the fact that the package described in Patent No. 1,977,580 relies upon an external coating to provide the necessary moisture-imperviousness to the package, and the internal coating is relied upon only as a container for the material during the boiling operation which is employed to render the material fluent, a package which has the external coating removed ready for use will be rendered worthless in the event that it is not used at that time, inasmuch as it cannot be again stored without undue moisture loss, except in the case of the glass bottle type of external container, which is relatively expensive to manufacture.

According to a recently developed technique in the dental art, it has been found advantageous, for example, while making inlays, to make an impression of the cavity to be inlaid by extruding the plastic impression material onto the cavity through a suitable dispensing nozzle. The ordinary trays which are adapted for full-mouth impressions, or even partial impressions, are too bulky for such small work and require the use of far more impression material than is necessary. With this new technique the tooth to be inlaid is surrounded by a ring or other small retaining structure and the plastic impression material may be extruded into the cavity directly from the original package of impression material provided by this invention.

Previously suggested packages of thermoplastic impression materials are not suited to such a technique. No package has had the requisite dispensing nozzle and in order to practice this technique it has been necessary to place the material in a suitable syringe. This not only requires additional equipment but also requires the practice of a number of extra steps, such as the transfer of the material from its original package to the syringe, which exposes the material to the air and thus increases the possibility of contamination.

The principal object of the invention is to provide an advantageous type of dispensing package of thermoplastic material.

Another important object of the invention is to provide a moisture-retentive package of thermoplastic material provided with a closure means constituting a dispensing nozzle.

A further object of the invention is to provide a dispensing package of the class described provided with a dispensing closure means which may be used for extruding a heated thermoplastic impression material from the package.

Another object of the invention is to provide a dispensing package of thermoplastic material which may be simply and inexpensively prepared.

A further object of the invention is to provide a dispensing package of thermoplastic material of such nature that a portion of the packaged material may be used and the remaining portion may be preserved in the package and utilized subsequently without undue deterioration.

Another object of the invention is to provide a package of the character described which has a moisture-impervious envelope capable of elastic deformation at temperatures adjacent or in the neighborhood of the boiling point of water so as to permit kneading of the contents in heated condition, as hereinafter set forth.

According to the present invention a moisture-impervious envelope coating is provided for a body of such impression composition which adequately protects the same from contamination and preserves the moisture content thereof, such envelope coating being of a flexible non-metallic material which is of high mechanical strength and capable of some elastic deformation at ordinary temperatures but readily capable of elastic deformation at elevated temperatures whereby the package may be immersed in water and heated to render the contained composition fluent after which the package may be kneaded to homogenize the composition and render the same suitable for use, without danger of rupture of the envelope during the kneading operation.

The coating material should be one which, even at the elevated temperatures at which the contained impression composition is handled to render the same fluent, retains a high degree of mechanical strength, and preferably also remains substantially moisture-impervious. The coating material is preferably one having a melting point somewhat in excess of 100° C. and relatively resilient and capable of elastic deformation at temperatures in the neighborhood of 100° C. The ability of the material to elastically deform at the high temperatures should persist to an important degree during cooling from adjacent 100° C. to in the neighborhood of 35° to 40° C., as it is common practice in dental technique to continue the kneading of the heated composition until the temperature thereof has dropped to a point such that it may be inserted within the mouth of a patient without undue discomfort. Alternatively, the package may be immersed in water which is heated to boiling and maintained at that temperature for a sufficient time to insure that the contained material is thoroughly converted to the fluent sol condition, and then immersed in a body of water which is at a temperature of about 45 to 47° C. and allowed to cool to that temperature without any kneading whatever. This technique, however, is not recommended for use with material which is relatively old, inasmuch as such material may require quite thorough homogenization before use, in which case the kneading procedure is necessary. The coating material is preferably also one which will exhibit a marked shrinkage upon cooling or drying, or one which may be shrunken in a convenient manner.

The envelope may be preformed of a material such as a suitably moisture-proofed cellulosic composition (such as a material formed from an inter-solution of a cellulosic compound and a moisture-proofing material such as rubber, resins, resinous gums, and high melting-point waxes) or from a resinous material such as the commercially available "Koroseal" (a polymerized vinyl halide). Alternatively, the envelope may be formed in position about the stick of hydrocolloid, in which case I prefer to employ a suitable solution of such a resin or other moisture-impervious composition, such as the commercially available material known as "Korolac" which comprises a solution of the above-mentioned vinyl resin in a suitable solvent. Of the above set forth materials, the resin "Koroseal" (and the coating material resulting from the use of "Korolac") is particularly advantageous in view of its property of shrinking upon drying and its marked shrinkage upon immersion in hot water. The coating formed from "Korolac" exhibits this feature of shrinking in hot water to a greater degree than the envelope formed directly from the "Koroseal" material and for this reason greater latitude is had in the formation of the packages of the present invention when the envelope coating is formed from "Korolac" solution.

The dispensing package of the present invention may comprise, in general, an elongated stick or cylinder of thermoplastic material disposed within an envelope of the character above described which extends substantially the full length thereof and is closed at one end, the other end of the package being closed by a dispensing member having portions in engagement with said envelope so as to provide a substantially moisture-impervious closure for said package and providing means for extruding material therefrom through a suitable discharge opening in said member. According to one embodiment of the invention the stick of thermoplastic material may be completely enclosed by an envelope of the character described and a dispensing nozzle member held in place exteriorly of the envelope and at one end thereof so as to form a substantially moisture-impervious connection therewith, whereby the envelope provides the necessary closure during the above-mentioned boiling and kneading operations and the connection between the nozzle member and the envelope is not utilized to prevent the material from escaping from the envelope during said operations.

Other features and advantages of the invention will either be specifically set forth in the following description or will be apparent therefrom. The accompanying drawing illustrates certain embodiments of the invention, and referring thereto:

Fig. 1 is a broken away longitudinal view of one form of package according to the invention in partially completed condition;

Fig. 2 is a partly broken away sectional view of one end of the package shown in Fig. 1, at a later stage in the process of manufacture;

Fig. 3 is a view corresponding to Fig. 2, showing a completed package;

Fig. 4 is a sectional view of one end of a stick of material with a dispensing closure member secured thereto, showing the first step in a procedure for the production of a modified form of package;

Figs. 5 and 6 are views corresponding to Fig. 4 and showing respective subsequent steps in the formation of an embodiment of the package;

Fig. 7 is a view corresponding to Fig. 6, showing a completed package;

Fig. 8 is a sectional view of a pre-coated dispensing closure member, useful in place of the form of closure member shown in Figs. 1 to 3 and 4 to 7;

Fig. 9 is a sectional view of a dispensing closure assembly of modified form, for use according to this invention;

Fig. 10 is a view corresponding to Fig. 4, showing a modified form of dispensing closure member useful according to this invention;

Fig. 11 is a view of one end of a stick of material with a further modified form of dispensing closure member secured thereto, said closure member and stick being in elevation with an attached cap member in section;

Fig. 12 is a view corresponding to Fig. 11, showing a partially completed package;

Fig. 13 is a view corresponding to Fig. 12, showing a completed package; and

Fig. 14 is a view taken on line 14—14 in Fig. 1.

Referring to Figs. 1 to 3 of the drawing, the numeral 1 indicates a stick of solidified thermoplastic material encased in a suitable moisture-impervious envelope 2, such as, for example, an envelope formed by dipping the stick 1 in a solution of "Korolac" in a suitable manner, as in accordance with the disclosure in my copending application Serial Number 83,647, Patent No. 2,108,953, Feb. 22, 1938. According to this embodiment of my invention I prefer to take a completely enveloped stick as shown in Fig. 1 and place a nozzle member 3 thereon as shown in ig. 2. The envelope 2 may comprise a preformed envelope, if desired, such as may be provided by inserting a stick of material into a preformed capsule type of container, which is subsequently sealed by dipping the open end into a suitable coating composition, or by means of a cap member suitably sealed in place. The nozzle member 3 is provided with a dispensing orifice or discharge passage 4 extending axially thereof, an enclosing screw cap 4a, and lower base or flange 5. When placing the nozzle member on the envelope 2 at the end of the stick I I preferably coat the under surface of the flange 5 or the surface of the envelope with a tacky or adhesive material so that the nozzle member will stay in engagement with the envelope when the envelope is inverted.

The stick may then be inverted and dipped into the envelope coating material to a suitable depth such as indicated by the numeral 6 in Fig. 3 so that the cap 4a and the flange 5 of the nozzle member are coated with an envelope 7 which bonds with the envelope 2 as at 8 so as to completely enclose the nozzle member 3. Upon removal from the dipping solution, the adherent coating will dry and shrink into firm engagement with the coated parts, forming a composite envelope in which the portion which extends over the nozzle member is integrally bonded to the envelope 2. If desired, the shrinkage may be augmented by dipping the dispensing end of the package, after drying, into hot water, which will secure an even more firm engagement of the coating material with the nozzle member.

When it is desired to use the impression material contained in the package the aforementioned boiling and kneading operations are carried out so that the material is in a fluent condition and is adapted to be discharged through the nozzle. In order to expedite the removal of the cap 4a I find it preferable to employ a cap which will be of such dimensions as to leave a gap between the lower end thereof and the flange 5, as at 9, so that by applying pressure at 11, over the gap 9, with a sharp object, such as a thumb nail, the envelope 7 may be scored or cut, and removed from about the cap 4a, which may then be unscrewed. A sharp pointed tool may then be inserted into the bore 4 of the nozzle member and the adjacent end of the envelope 2 punctured so that the impression material may be extruded from the nozzle.

Due to the aforementioned shrinkage of the envelope material, the flange 5 is held securely in position between the envelope portions 2 and 7 so that if it is desired to use only a portion of the impression material, the cap 4a may be replaced and the package stored for a relatively protracted period without undue loss of volatiles, in view of the fact that such volatiles would be required to pass out of the above-described opening in the end wall of the envelope 2, thence between said envelope and the inner face of the flange 5, thence around the peripheral edge of said flange, and thence between the outer face of the flange and the coating 7 to the broken edge of said coating. Such escape is substantially prevented by the firm engagement of the envelope with the closure member due to the above-mentioned shrinkage. The package may be boiled and kneaded again as above mentioned and it will again function satisfactorily as an extruding or dispensing type of package.

In Figs. 4 through 7 I have shown a form of dispensing package in which the dispensing closure member is placed in position upon the stick before the stick is coated with the envelope material, and referring to said figures: A nozzle member 23 (which may be comparable to the nozzle 3) is shown in place on the upper end of a stick of thermoplastic material 21. The nozzle 23 is shown as comprising a flange 25 and a plurality of curved talon members 26 which are embedded in the stick 21, for example, by exerting an inward pressure on the nozzle 23 and twisting the same into engagement with the stick (said talon members being preferably of comparable but opposite curvature and located at opposite sides of the center of the flange 25). This serves to position the nozzle member in its desired relation to the end of the stick during subsequent dipping operations. (It will be appreciated that the alternative holding means shown in Fig. 10, hereinafter described, may be employed instead of the talons 26, if desired.)

The stick may then be held by the nozzle member and dipped into the coating solution bottom first so that a coating or envelope 22 may be formed which covers the bottom and sides of the stick and extends over the flange 25 as at 27 in Fig. 5, the flange 25 constituting shoulder means in engagement by said portion 27 of the envelope 22. A cap 24, comparable to the cap 4a, may then be placed on the nozzle member and, if desired, the package may be considered as completed in the form shown in Fig. 5. The above-described shrinkage of the coating material (particularly when a coating of "Koroseal" or the like is employed) will provide a sufficiently moisture-retentive engagement with the flange 25 of the closure member to effectually seal the package against moisture loss for reasonable periods. The sealing may be augmented by providing a cap member 24 of sufficient length so that the lower end thereof 24a may be screwed into positive frictional engagement with the inner limit of the portion 27 of the coating 22, as indicated at 20. A package of this type, while adequately preventing moisture loss or loss of other volatiles from the contained material, requires very careful handling in the above-described boiling and kneading operations, inasmuch as the closure member will tend to slip inwardly of the envelope 22 and allow escape of the fluent material around the periphery of the flange 25, unless the closure member is carefully held in the hands during the kneading operation. For this reason I prefer to provide auxiliary sealing means for positioning the closure member at one end of the package. Such auxiliary means are illustrated in Figs. 6, 7, 8, 9, and 11–13.

It will be appreciated that the same construction may be obtained by using a preformed envelope. In this case the stick may be inserted within a capsule which is of sufficient length as to extend above the upper end of the stick, and the nozzle member is then placed in position against the end of the stick, and the projecting portion of the envelope at the open end of the package is then immersed in boiling water for a few minutes to cause the projecting end portion of the envelope to shrink about the flange 25 into much the same relation as that produced by the dipping procedure described in connection with Fig. 5.

According to the embodiment shown in Figs. 6 and 7 I may provide a stiffening member or ring 28 having a shoulder portion 29 adapted to engage the envelope portion 27 and a downwardly extending rim portion 30 adapted to extend over the periphery 25' of the flange 25 in position to force the envelope 22 into frictional engagement with and beneath said flange.

In this construction the flange 25 is preferably of a diameter somewhat greater than the diameter of the stick 21, and the stiffening ring 28 may be spun or rolled over the periphery of the flange 25 whereby the rim portion 30 is caused to engage the upper portion of the coating 22 and force the same beneath and inwardly of the periphery of said flange to form an interlocking construction which will effectively prevent displacement of the nozzle member during the above-mentioned kneading operation. In the event that the package is to be stored for an extended period before use, as in the event of shipment thereof to foreign countries for use, or the like, I find it preferable to provide an auxiliary envelope coating over the upper end of the package, as shown in Fig. 7. This form of package may be prepared by inverting the form of package shown in Fig. 6 and dipping the same to a sufficient depth, as indicated at 31 in Fig. 7, whereby the member 28 is completely coated by the dipping material through the formation of a coating which extends from the coating 22 over the end of the cap member 24, as indicated at 32, the coating 32 being integrally bonded to the coating 22, as at 33.

The operations required for using this package are comparable in every respect to the operations described in relation to the form shown in Fig. 3 except that it is not necessary to puncture an inner seal at the inner end of the nozzle member before the contained material is extruded.

Referring to Fig. 8, I have shown a nozzle member 23a, comparable to the nozzle 23 in Fig. 4, which has been dipped in a coating solution such as above described to form a coating 37 about its flange 25a (comparable to the flange 25). The talon members 26a may also become coated during the dipping procedure and it may be desirable in some instances to strip the coating off of the talons before it has time to become set, i. e., after the coating has gelled but before it has become unduly toughened by evaporation of the solvent. The nozzle member shown in Fig. 8 may be attached to a stick of thermoplastic material as shown in Fig. 4 and the entire assembly given a single dip in a coating solution, as brought out in the description of Fig. 5. It will be appreciated that the coating solution into which the entire assembly is dipped will be of such nature as to form a coating which bonds integrally with the coating 37, and may advantageously be of the same material. The coating formed in this dipping operation extends over the edge of the coating 37, and preferably extends inwardly over the top of said coating 37. The package may then be utilized without further dipping, since the flange will be held firmly between two layers of coating material and a substantially moisture-impervious joint is formed at the juncture of the coating 37 and the coating over the stick (comparable to the coating 22 above). A cap member, such as the member 4a, is placed on the nozzle to complete the closure, and the package may be dipped after the manner of Fig. 3 or 7, if desired, so as to form an envelope which completely covers the cap and nozzle members. The finished package would then be somewhat comparable to the package shown in Fig. 3, inasmuch as the flange portion of the closure member is held firmly between two layers of coating material.

In Fig. 9 I have shown a modified form of nozzle member 43 comprising a dispensing passage 44, a base or flange 45 and a plurality of downwardly extending prongs 46. A package comparable to the one described above with relation to Fig. 8 may be fabricated by utilizing a suitable washer or disc member, such as the washer 47, which will bond with the coating material. If the coating material is "Korolac", for example, the disc 47 may be fabricated from "Koroseal". I prefer to form the disc as a washer having a central opening 48 alined with the opening in the nozzle member and to provide suitable centering means such as openings 49 in the disc for receiving the prongs 46. The prongs 46 may thus serve to aline the disc and to temporarily hold the disc and nozzle in engagement with a stick of thermoplastic material when the assembly is dipped to form a complete package, after the manner described above with relation to Fig. 8, the dip coating covering the upper face of the flange 45 and forming a bond with the washer 47 at the periphery thereof 47a. The washer 47 may be provided with an upstanding collar or rim portion within which the flange 45 may be inserted, and the whole structure immersed in hot water to shrink the collar or rim into engagement with the flange, providing a structure alternative to but somewhat comparable to that shown in Fig. 8.

It will be appreciated that a stiffening or ring member comparable to the ring member 28 may be used in any of the delineated forms of my invention, if desired, or that the ring member may be omitted from any or all of the above embodiments according to the discretion of the fabricator.

Fig. 10 illustrates a modified means for preserving the desired position of the dispensing nozzle means at the end of the stick of material, in which a nozzle member 50 having a discharge passage 51, a flange 52 and a projecting cylindrical portion 53 is attached to a stick 54 by inserting the portion 53 into the body of the stick at one end with the flange 52 abutting said end, the portion 53 being preferably tapered to permit easy insertion within the end of the stick. The cylindrical portion 53 may be of any desired diameter, as will be apparent, and may be formed, for example, as a collar which will receive the diameter of the stick. In any case the portion 53 is adapted primarily to prevent sidewise dislocation of the stick and the nozzle in the dipping procedure, which is preferably carried out with the stick in inverted position, as hereinafter described.

In Fig. 11 a stick 61 of thermoplastic material is shown with a nozzle member 63 in engagement with one end thereof through the agency of talons 66 in a manner comparable to that described in relation to Fig. 4. The nozzle member 63 is preferably provided with a flange member 65 having a shoulder portion 67 provided with a peripheral recess 68. The nozzle member 63 may be also provided with a cap member 64 and, as shown in Fig. 12, the stick and nozzle member may be dipped to a sufficient depth to cover the shoulder portion 67 to any convenient height as indicated at 69 to form a coating 62. After the coating has dried or hardened sufficiently, an auxiliary sealing member such as a split ring 71 may, if desired, be slipped over the nozzle member and into engagement with the portion of the coating 62 over the recess 68 so that the coating is held firmly in the recess by the ring as shown in Figs. 13 and 14. The stick may be dipped again, if desired, as in Fig. 3 or 7, to form a coating over the cap 64 which will bond with the coating 62 and form a more moisture-proof envelope, which additional coating will also serve to securely position the ring 71. It will also be apparent that the nozzle member may be provided with a substantially cylindrical shoulder portion instead of the peripheral recess 68, and a split ring or the like placed over this shoulder portion in engagement with a coating of material corresponding to the coating provided at 62, inasmuch as any subsequent kneading operation will have a tendency to stretch the coating portion 62 toward the flange portion 65 rather than toward the tip of the nozzle, and the ring member would not have any definite tendency to slip off. With this latter form of construction a coating positioned over the ring member as by dipping according to the procedure described in connection with Fig. 3 or 7, will provide a positive placement of the ring member with respect to the cylindrical shoulder above described.

In the formation of the envelope coating by a dipping procedure, I may employ a mixture of Celluloid and rubber in a suitable solvent, such as may be formed from an intermixture of two equal volumes of cyclohexanol or cyclohexanol acetate in which from 10% to 30% by weight of Celluloid and raw rubber have been respectively dissolved, the mixture being preferably evaporated to a thin honey-like consistency. Where the Celluloid-rubber mixture is employed, it will be necessary to allow the envelope coating to dry to some extent before any auxiliary sealing member is placed in engagement therewith.

In general, I prefer to employ a composition which will form a transparent envelope and which will solidify or gel at a more rapid rate than the above-mentioned Celluloid-rubber mixture, such as the above-mentioned "Korolac". In the above-mentioned "Korolac" the "Koroseal" is in solution at a relatively high temperature, but solidifies to a gel form at a relatively lower temperature. When the stick of hydrocolloid material and the associated closure member is dipped into a heated bath of "Korolac", the material will gel out on contact and form a continuous envelope over the dipped area, which may be handled almost immediately.

As a specific example of the formation of envelope coatings by a dipping procedure where the envelope coating is formed of the resin "Korolac", I heat a quantity of "Korolac" containing approximately 10% "Koroseal" to a temperature in the neighborhood of 77 to 85° C., and immerse the desired body therein and promptly withdraw the same. The coating thus formed will be in the neighborhood of one-eighth of an inch thick on gelling, which coating will dry down to a layer approximately five-thousandths of an inch thick in a period of 48 hours, during which the above-described shrinkage takes place. Where heavier coatings are desired, multiple dipping may be practiced in such manner as to form a plurality of superimposed thicknesses of coating material in the production of membranes in excess of 0.01 inch in thickness. Alternatively, the thickness of the coating can be varied by a control of the temperature of the dipping bath and the temperature of the stick of hydrocolloid when dipped. For example, if a temperature lower than about 83° C. is employed for the dipping bath, a thicker coat will be formed and similarly, if the stick of hydrocolloid is chilled before dipping, a heavier coat will result. In the formation of heavier coatings by successive dipping procedures, it is not necessary that the previous coat be allowed to completely dry before a second coat is placed thereupon, inasmuch as it is sufficient only that the coating be chilled to gel condition between such successive coats.

In the above description I have indicated that the assembly may be grasped at the nozzle end and lowered into a body of the dipping solution in the formation of the desired envelope coating, but it will be appreciated that this procedure may sometimes result in the nozzle member becoming disengaged from the stick of thermoplastic material, by disengagement of the claws, talons or other means which provide attachment between these two elements. According to a preferred practice of the dipping procedure I prepare a dipping rack provided with a plurality of upwardly directed recesses adapted to receive either the nozzle itself or the nozzle including the associated cap member, invert the article to be dipped and insert the nozzle or cap members thereof within such recesses. The rack is then dipped into the dip solution, providing a coating over the desired portion of the articles, and then withdrawn. As soon as the coating has gelled out to a sufficient extent that the packages may be handled, the coating material may be scored or cut adjacent the cap or nozzle member and the coated packages removed from the rack. When a nozzle member such as shown in Fig. 10 is employed, some such form of inverted dipping is required.

According to one contemplation of the invention, I may employ nozzle members which are fabricated from a high melting point composition which is of such a nature as to integrally bond with the coating produced by the dipping procedure. For example, nozzle members may be preformed from "Koroseal" resin which has a softening point somewhat above the boiling point of water, so that the nozzle member will remain substantially rigid throughout the boiling and kneading operation. The cap members which are adapted to enclose the nozzle opening may be formed of any desired material, such as metal or the like, dependent upon the particular choice of the manufacturer or user.

The nozzle members may be advantageously formed of metal or of a so-called "plastic" such as "Bakelite", if desired. Metal foil packages have heretofore been found objectionable from the standpoint of causing discoloration of the contents, as above pointed out, but it will be appreciated that where metal is used to form a nozzle member for the present package, there is no requirement of high ductility as in the case of a metal foil, wherefore desirable non-corrosion characteristics may be secured in a nozzle member by proper selection of the metal employed in the fabrication thereof.

Many other modifications will appear to those skilled in the art and I do not choose to be limited to the specific forms herein delineated, but rather to the scope of the appended claims. Furthermore, it will be obvious that the shape or length of the nozzle member may be varied throughout rather wide limits, dependent upon the particular use to which the package is to be put. It will further be appreciated that in the event that the package is not intended to be used for the purpose of extruding the contained material through a small aperture into a restricted area for the practice of the above-mentioned inlay technique, and in the case where the entire contents of the package are desired to be used at one time, the opposite end of the package may be cut as with a pair of shears and the entire body of material extruded from the package into the conventional type of impression tray employed by dental practitioners. One of the essential characteristics of the package of the present invention, however, lies in the fact that a desired quantity may be extruded through the nozzle member and used, and the remaining portion of the material preserved within the package for use at a later date without danger of contamination. It will be appreciated that any contamination which is obtained at the tip of the nozzle during the use thereof, may be dissipated in the boiling operation during which the material is again placed in fluid condition for use, inasmuch as such boiling operation may be extended over a sufficient period to effect adequate sterilization of the contents.

It will further be appreciated that suitable reinforcing means may be provided for the envelope itself, to provide constructions in which the flexible envelope is sufficiently strong to withstand abnormal pressures as might be realized when a small apertured nozzle is employed for fine work, such as in the above-described inlay technique. Such a construction may be provided by inserting a stick of the hydrocolloid within a closely fitting sack of suitable fabric such as silk, which is gathered together at one end and dipped in a suitable coating material such as the above-mentioned "Korolac" so as to produce an integrally bonded coating layer comprising the fabric material embedded in the moisture-impervious coating material. The dispensing nozzle means may then be secured to one end of the package after the manner described in connection with Figs. 1 to 3 or, alternatively, a capsule type envelope may be prefabricated upon a suitable fabric base and employed according to the procedures disclosed in connection with any of the other forms of the invention herein disclosed.

I claim:

1. A package of thermoplastic material, which comprises: a stick of thermoplastic material, a non-metallic flexible moisture-impervious envelope enclosing one end and the length of said stick; and a dispensing closure means at the opposite end of said stick in engagement with said envelope and completing the closure of said package, said envelope and said closure means being provided with cooperating shoulder means adapted to position said closure means at said one end.

2. A package of thermoplastic material, which comprises: a stick of thermoplastic material; a dispensing closure means positioned wholly at one end of said stick; and an envelope of flexible moisture-impervious non-metallic material extending immediately over and enclosing the opposite end and the length of said stick and engaging said closure means, said closure means being provided with an outwardly directed extended portion and an associated upwardly directed shoulder member in engagement by said envelope to complete the closure of said package.

3. A package of thermoplastic material, which comprises: a stick of thermoplastic material; a non-metallic flexible moisture-impervious envelope enclosing one end and the length of said stick; and dispensing closure means at the opposite end of said stick integrally bonded with said envelope to complete the closure of said package.

4. A package of thermoplastic material, which comprises: a stick of thermoplastic material; a dispensing closure means provided with shoulder means and positioned at one end of said stick; and a non-metallic flexible moisture-impervious envelope enclosing the opposite end and the sides of said stick and in engagement with said shoulder means and completing the closure of said package.

5. The package set forth in claim 4, and also comprising: an auxiliary sealing member in engagement with said envelope and maintaining said envelope in engagement with said shoulder means.

6. A package of thermoplastic material, which comprises: a stick of thermoplastic material; a dispensing closure member at one end of said stick; a flexible moisture-impervious envelope enclosing the opposite end of said stick and the sides thereof and engaging said closure member to complete the closure of said package; and a ring member engaging said envelope adjacent said closure member in position to force said envelope into intimate engagement with said closure member.

7. A package of thermoplastic material, which comprises: a stick of thermoplastic material; a dispensing closure member provided with a flange member disposed at one end of said stick; a flexible moisture-impervious envelope enclosing the opposite end and sides of said sticks; a layer of moisture-impervious material engaging the outer surface of said flange and integrally bonded to said envelope to complete the closure of said package; and a layer of moisture-imprevious material extending between said flange and said stick of thermoplastic material and integrally bonded to said envelope to position said flange member and said closure member at said one end of said package.

8. The package set forth in claim 7, said closure member comprising a nozzle member provided with a dispensing passage and a cap member removably secured to said closure member in position to seal said passage.

9. A package of thermoplastic material, which comprises: a stick of thermoplastic material; a dispensing closure member provided with a flange member disposed at one end of said stick, said flange member being provided with a surface coating of moisture-impervious material at the peripheral portions thereof, said coating having portions disposed at the respective inward and outward sides of said flange; and a flexible moisture-impervious envelope enclosing the opposite end and sides of said stick and integrally bonded to said surface coating.

10. A package of thermoplastic material, which comprises: a stick of thermoplastic material; and a moisture-impervious package structure completely enclosing said stick; said package comprising dispensing closure means disposed at one end of said stick and an envelope of flexible non-metallic moisture-impervious material extending immediately over and enclosing the opposite end and the sides of said stick and engaging said closure means, said envelope and said closure means being provided with cooperating and interengaging shoulder means adapted to resist displacement of said closure means from its position at said one end.

WALTER J. van ROSSEM.